Figure 1:
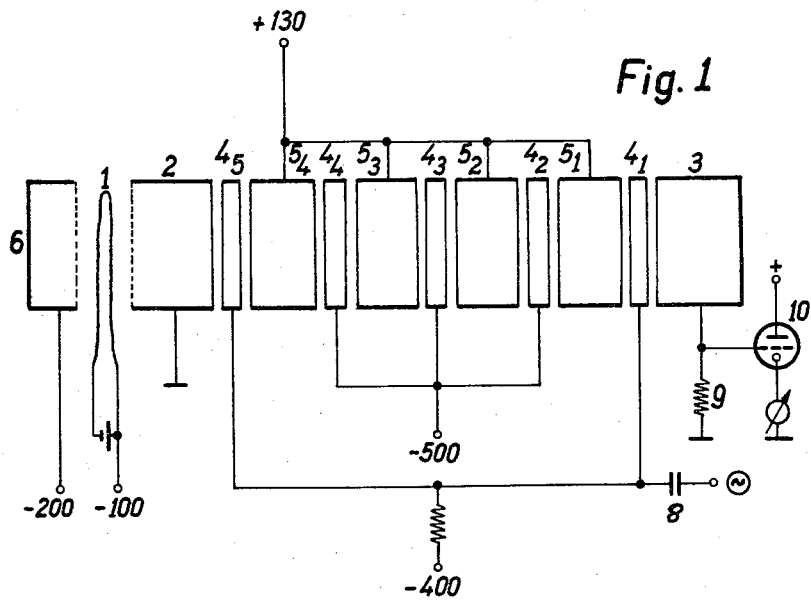

Oct. 15, 1963  W. TRETNER  3,107,295
DEVICE FOR DETERMINING THE MASSES OF CHARGE CARRIERS
Filed June 10, 1959  3 Sheets-Sheet 1

*Inventor:*
Werner Tretner by Michael S. Striker
attorney

Oct. 15, 1963  W. TRETNER  3,107,295
DEVICE FOR DETERMINING THE MASSES OF CHARGE CARRIERS
Filed June 10, 1959  3 Sheets-Sheet 3

*Inventor:*

Werner Tretner by Michael S. Striker
attorney

United States Patent Office 3,107,295
Patented Oct. 15, 1963

3,107,295
DEVICE FOR DETERMINING THE MASSES OF CHARGE CARRIERS
Werner Tretner, Darmstadt, Germany, assignor to Fernseh G.m.b.H., Darmstadt, Germany
Filed June 10, 1959, Ser. No. 819,425
Claims priority, application Germany June 13, 1958
11 Claims. (Cl. 250—41.9)

In recent times there have become known mass-spectrographs the mode of operation whereof depends upon the separation of ions of different relative masses in a high-frequency field. A tube introduced into the technique under the name Omegatron contains two opposed electrode systems of approximately quadrantal form, between which is generated a homogeneous alternating electric field. Into the centre of the system passes an electron beam, which ionizes the gas molecules present. If now a powerful magnetic field is generated parallel to the electron beam, then under the influence of the accelerating effect of the alternating field the ions formed in the path of the beam describe an outwardly-expanding spiral and finally impinge upon a collector connected to a measuring instrument. The conditions for radial acceleration are, however, obtained only when the relation $$\omega = \frac{e \cdot B}{m}$$

is fulfilled between the high frequency $\omega$, the mass of the ions ($m$) and the strength ($B$) of the magnetic field, that is, a current appears in the lead to the collector only if resonance exists between the gyratory frequency of the ions and the high frequency. This arrangement allows a relatively accurate determination of the mass of the ions, but is for many purposes inconvenient, since a heavy electromagnet or permanent magnet is necessary to generate the magnetic field. For this reason the mass of the ions, or the range of adjustment of the device, is limited.

It has also been attempted to manage without a magnetic field. A known apparatus operating with electric fields only consists of a number of grids or nets arranged in succession, which are connected alternately to opposite phases of an alternating voltage. Of the ions enclosed in the space between the first two nets, only those undergo a continuous acceleration which enter the next accelerating space always in the correct phase. For a predetermined frequency there is thus obtained a separation of all ions of the same mass. After passing through a screen grid these separated ions may yield their high-frequency energy to a collector electrode. A disadvantage of this arrangement is the ambiguity of the indication, since acceleration of one and the same kind of ions may be effected by harmonics of the fundamental frequency. The sensitivity of this apparatus is limited by loss of ions, at the grids and by inaccuracy in the construction of the electrodes. The phase-focusing is sufficiently effective only with an adequate number of grids. In this case a very considerable fraction of the total current of ions is intercepted even with a low shadow-factor of the grid.

With the electrode arrangement according to the invention for the separation of charged particles according to their mass, especially for the determination of the ions of a residual gas, a space for movement of the ions is formed, which is formed by two electrodes bounding the space available for movement and arranged, for example, symmetrically relative to an imaginary median plane, and a series of electrodes encompassing the main path of motion of the ions, for example ring-shaped, especially rotationally symmetrical. The forms and the direct voltages of the electrodes are then so chosen that the charge carriers traversing the device in the main direction of movement are focused by electrostatic focusing fields at the magnification ratio of approximately 1:1 between surfaces in the neighborhoods of the end electrodes. The effect of this arrangement is that the charge carriers travel repeatedly between the end electrodes with a close approximation to harmonic motion. The planes in which lie the points of reversal of the paths of the charge carriers may either be imaged one upon the other, or alternatively each may be imaged upon itself (possibly by reflection).

Preferably at least one of the end electrodes is made in the form of a grid and within these, and thus within the space available for movement, ions are generated by an ion source. The ion source may be a thermionic cathode at a high negative potential, electrons from which oscillate to and fro about the plane of the grid of the end electrode and thus ionize molecules of the residual gas. To generate a signal suitable for determining masses one of a number of, for example, ring-shaped electrodes may be connected to a high-frequency source, preferably of variable frequency, and at one end of the space available for movement there may be provided a collecting electrode held at a considerably more positive potential than that at which the ions enter. At this electrode, which may also be formed by one of the end electrodes, may be measured either as a direct current or as a high-frequency signal of the ionic current which is in resonance with the exciting frequency. For very small ion concentrations the collecting electrode also may be made permeable, with an electron multipler arranged behind it in which electrons are released by the incident ions. With this electron current multiplied by a factor of $10^6$ the electron multiplication then allows the amplitude of the mass spectrum to be made visible on an indicating meter.

According to another embodiment there may also be arranged behind the first space for movement a second one in which an increase in the number of ions accelerated by the separation is produced, these ions being collected on a suction electrode by means of a voltage impulse. By this means also an increase in the sensitivity may be produced.

The end electrodes advantageously possess a cup-shaped form. The length of the end electrodes is then advantageously approximately so great that the time of travel within each end electrode is exactly as long as the time of travel in all the remaining electrodes, so that the lengths of the two end electrodes are thus related to the length of the remaining system as 1:2.

Figure 2:
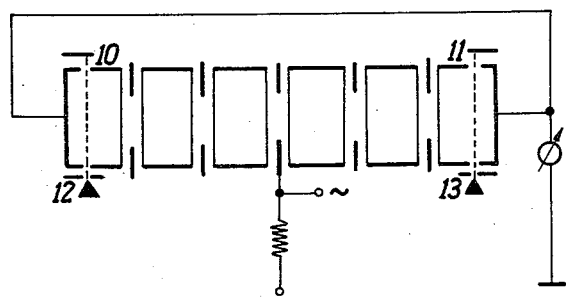
Figure 3:
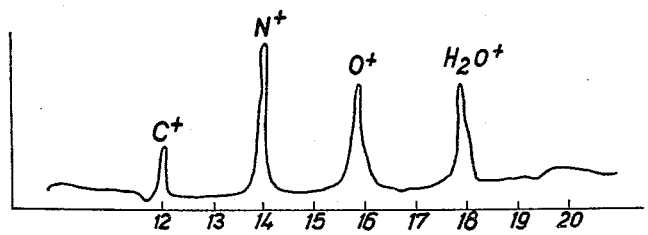
Figure 4:
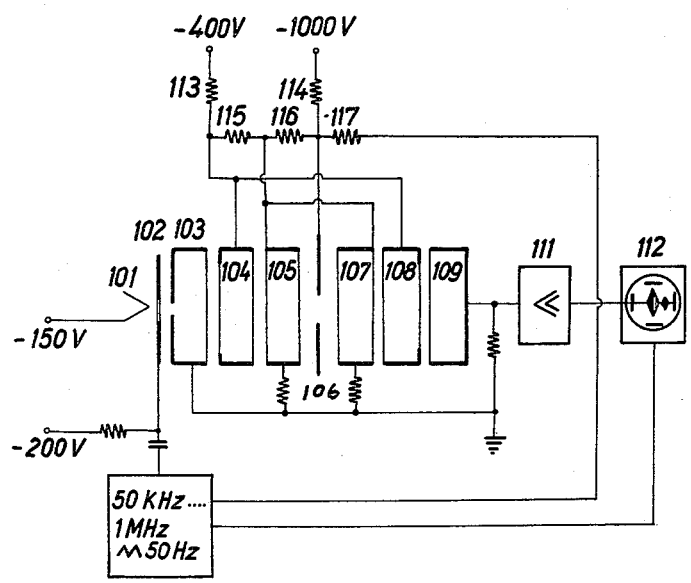
Figure 5:
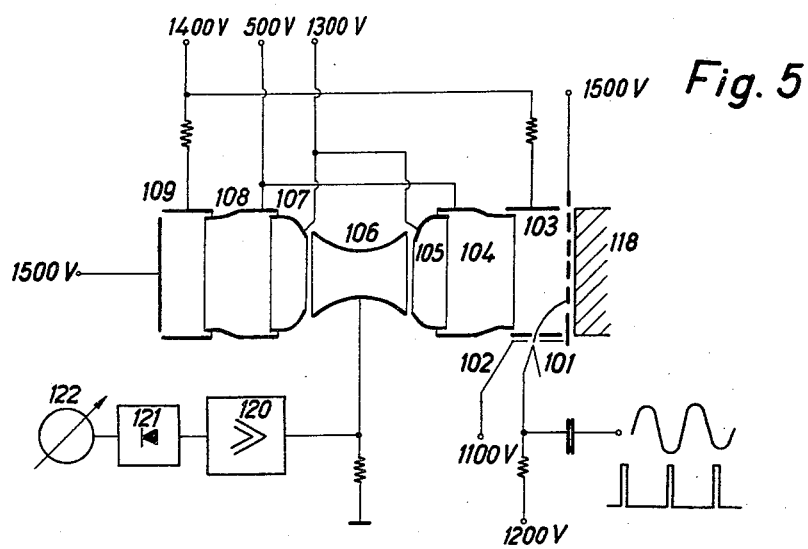
Figure 6:
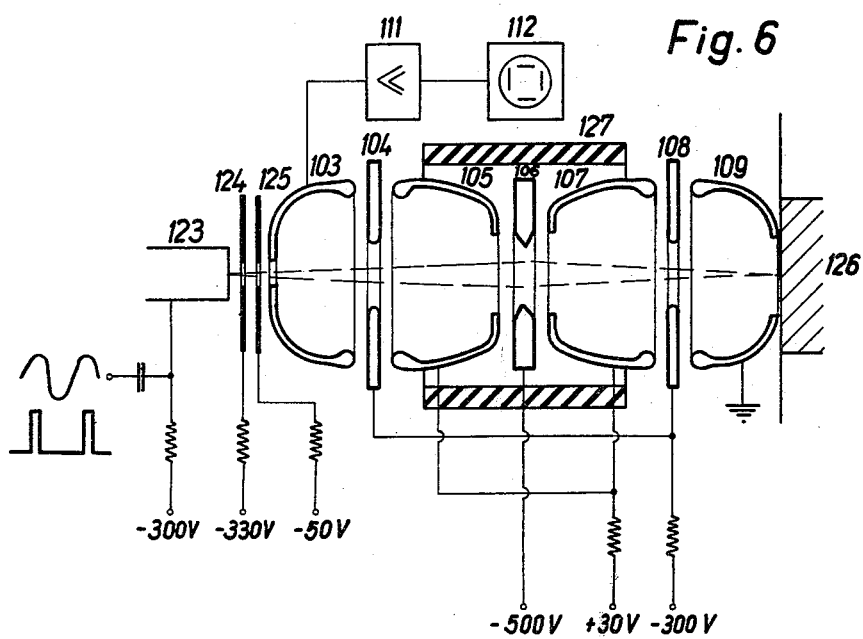
Figure 7:
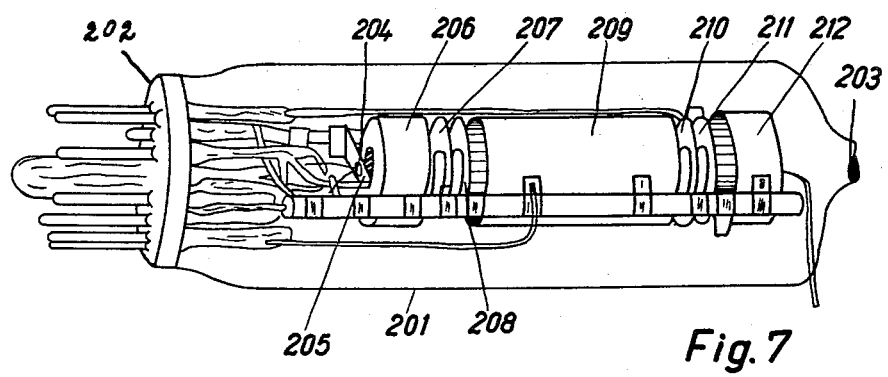

In the following a number of examples of embodiments of the invention are further explained with reference to the FIGURES 1 to 7. Of these:

FIGURE 1 shows in schematic representation an electrode arrangement with an ion source and the associated test circuit, FIGURE 2 shows a similar electrode arrangement with a special construction of the ion source, FIGURE 3 shows a mass-spectrogram such as can be obtained in practice by altering the operating frequency, FIGURE 4 shows an electrode arrangement with special ion source and an improvement of the modulating circuit, FIGURE 5 shows a modified electrode arrangement for a special problem of analysis, FIGURE 6 shows an arrangement for the same problem of analysis with an improvement of the electrode arrangement and FIGURE 7 shows in perspective representation a practical arrangement of a spectograph tube.

The electrodes of the tubes shown in the FIGURES 1, 2 and 4 to 7 can be either cylindrically or rotationally symmetrical or may possess a multiple symmetry to the axes.

In FIGURES 1, 1 is a hot cathode, 2 and 3 are the two end electrodes. Between these is situated a number of focusing electrodes of annular form but of different length, in particular, short rings $4_1$, $4_2$, $4_3$, $4_4$ and $4_5$ and between these the cylinders $5_1$, $5_2$, $5_3$ and $5_4$. On the side of the hairpin cathode 1 remote from the movement space there is also situated an auxiliary electrode 6, which collects the unused ions. In the circuit arrangement for the system, the electrodes $4_1$ and $4_5$ are connected by way of a resistance 7 with a voltage source of —400 volts. In addition the electrodes are fed with a high-frequency voltage by way of the condenser 8. The electrodes $4_2$ to $4_4$ are connected together and are held at —500 volts, the cylindrical electrodes $5_1$ to $5_4$ at a positive potential of 130 volts. Finally, the end electrode 3 is connected to earth by way of a resistance 9. This resistance may be formed by a galvanometer, if an additional direct-current amplifier is not connected here, as is indicated by the valve 10.

In the operation of this arrangement electrons are emitted from the cathode 1, which penetrate the end electrode 2 constructed in the form of a grid, and ionize a region on both sides of the grid. The ions generated in the region on the cathode side flow to the electrode 6, on the other hand the ions generated in the interior of the end electrode 2 are accelerated by the electrode $4_5$ and sweep through the movement space between the electrodes 2 and 3 in several oscillations. Owing to the introduction of high-frequency energy at the electrodes $4_1$ and $4_5$, the ions which are in resonance with this frequency are so much accelerated that after several movements to and fro they can reach the end electrode 3 and therefore give rise to a signal current. The magnitude of the signal current is a measure of the number of ions of equal mass present in this frequency range.

The resolution of the lines which appear on an indicator screen or the like depends essentially upon whether the generation of the ions is carried out over a wide range of potentials or only at a single potential. The sensitivity can be increased, for example, by means of an arrangement according to FIGURE 2. In this arrangement electron beam systems 12 and 13 are associated with the two end electrodes 10 and 11, which make it possible to dispatch an electron beam through the interior of the end electrode approximately along a unipotential surface. In this case the ions are produced with practically the potential of the electron beam and a very high resonance resolution can be obtained. The measured current can be taken either from the two end electrodes 10 and 11 themselves, as shown, or from collectors placed behind the end electrodes, provided as the outer end walls of the end electrodes 10 and 11 are formed to be permeable. Further modifications for homogenizing the fields, or for additional focusing, lie within the scope of the present invention. For example, the arrangement can be enclosed by a focusing coil, the magnetic field of which makes possible a concentration of the electrons to a region in the neighbourhood of the axis of the system, for example if the tube is to be used for the measurement of vacuum by means of the current of positive ions, which then flow radially.

The ion source indicated in FIGURE 1, in which the ionizing electrons oscillate through the grid-shaped perforated end of the end electrode 2, has the advantage that there are situated in the neighbourhood of the reversal planes of the electrons discrete regions in which ions are formed. These regions are defined by the exactly-defined energy required for ionizing a molecule or atom. The ions which are formed in these regions have a sharply-defined energy and are therefore in the position to be fully subjected to the high resolving power of the arrangement. In the spectrogram, (see FIGURE 3) ions of this origin give rise to sharply-defined peaks. In the previously-described examples of embodiments of the electrostatic arrangement for the separation of masses, the ions are subjected to high-frequency energy by the application of an alternating voltage to one or more of the electrodes encompassing the path of oscillation.

It is now found that the sensitivity and resolution of the apparatus can be substantially improved in accordance with a further feature of the invention, if the charges are generated in rhythm with the frequency of oscillation of the masses to be investigated, if, for example, the ionizing electron stream is modulated at high frequency. This modulation preferably has such a waveform that the signal voltage generated from the ionic current progresses sinusoidally and over-oscillations are avoided. The frequency of this modulation is advantageously altered at low frequency range under consideration for the investigation of the masses is traversed approximately in rhythm with the main frequency. The signal voltage obtained, which is taken for example from the most remote electrode of the oscillation space, can be applied to one pair of plates of an oscillograph, the other pair of plates of which is fed with the low frequency. This circuit provides an arrangement which makes possible, for example, a very rapid and convenient supervision of the processes of evacuation and outgassing of electron tubes.

In some cases it may also be advantageous to modulate the electron current by impulses. In order to obtain still greater selectivity, the electrodes generating the field for oscillation can be supplied, in addition to direct voltage, with alternating voltage at the frequency of the high-frequency modulation and the phases of the high frequency on the individual electrodes can be so chosen that the ions not wholly in resonance undergo a phase correction, while the ions progressing out of phase are separated out. An improvement of the electron-optical quality of the field for oscillation is also effective in the same sense. An improvement in this connection is attained, for example, by raising the number of electrodes from seven to nine or thirteen, etc., and by the employment of diaphragms which exclude from the oscillatory process ions with excessive lateral components of velocity. For simple apparatus, on the other hand, the number of electrodes will be kept between three and seven and the diaphragms chosen largely in favour of a high intensity.

An electrode arrangement constructed and connected in the above manner makes it possible substantially to improve the phase conditions, so that the resolution of the mass spectrogram allows the analysis of all the gases interesting in vacuum technique, for example. In addition the input impedance of an amplifier used in the arrangement may also be formed as a band-pass filter of which the pass-band is altered in rhythm with the low frequency. By this means over-oscillations and the appearance of noise may be kept from the output of the amplifier. It is often suitable to first rectify the amplified high-frequency signal and only thereafter to apply it to an indicating device, e.g., an oscillograph, of which the bandwidth is quite sufficient to make full use of the resolution of the spectrometer tube. By the combination of the described mass-spectrometer with an oscillograph there results a very useful tool with which on the one hand the components of a mixture of masses can be simultaneously observed, and on the other hand detailed evidence as to particular ingredients in the form of gas can be obtained.

It is in addition possible with this apparatus to measure the quality of the vacuum, and this in two different manners. For example, all the ions in oscillation may be collected at the same time by lowering the voltage of an end electrode to a condsiderable negative potential with the help of impulses and thus a current can be obtained which is indicative of the vacuum. A similar effect is obtained if the electron beam is modulated, instead of with a high frequency, with impulses of which the frequency is small compared with the frequency of all the masses present. Finally, it is also possible to measure the noise level of the ion current.

By the production of conditions of modulation by which there is obtained a definite coordination between the period of oscillation of the ions and the indicated frequency, there results the possibility of extending the test function to the analysis of solid bodies into their content of easy or hard to evaporate constituents. For example, the body may be bombarded with a sharply-focused modulated electron beam and the composition of the body determined by evaporation of the material at the point of impact. The material to be analysed then forms part of one of the end electrodes, or it lies directly behind a permeable, grid-shaped end electrode.

In the FIGURES 4 to 7 there are depicted examples of embodiments of the invention which concern the improvement of the mass-spectrometer in respect of the presentation of the derived signal, in addition to the electron optics and the application for analytical purposes.

In FIGURE 4 101 is a thermionic cathode which sends a beam of electrons into the mass-spectrograph through the diaphragm 102. The space for oscillation of the ions is formed by the electrodes 103, 104, 105, 106, 107, 108 and 109, of which 103 and 109, 104 and 108, 105 and 107, respectively are at respectively equal potentials. The electrode 106 lies in the plane of symmetry of the arrangement and is held at a potential of e.g. —1000 volts. Its form is that of a diaphragm which collects ions outside the axis of the system. The electrodes 104 and 108, as well as 105 and 107 are connected to voltage dividers of such dimensions that a direct voltage field with stabilizing characteristics for positive ions is formed. An oscillator 110, of which the frequency is altered between 50 kc./s. and 1 mc./s. with a frequency variation at 50 c./s. serves for the modulation of the electrons. This oscillator voltage is also connected with the electron gun system 101, 102 and serves to modulate the electron current sinusoidally, so that there is effected an ionization of the gas molecules present in the entrance aperture of electrode 103 in rhythm with the oscillator frequency. The ions now oscillate to and fro on the path between the electrodes 103 and 109, while their number is measured through the amplifier 111 on the basis of the charges induced on e.g. the electrode 109. The test indicator plates of an oscillograph 112 are connected with the output of this amplifier 111, while the time sweep plates are synchronized with the frequency of 50 c./s. from the oscillator 110. The impedances 113, 114, 115, 116 and 117 can advantageously consist of such inductances, capacitances and ohmic resistances that the ions situated within a certain phase angle in the oscillation space are phase-focused, but other ions oscillating outside this phase angle are eliminated. By this means the resolution of the line spectrum on the screen of the oscillograph 112 can be further increased. The indication of the oscillograph can be further advantageously improved by employing a so-called Skiatron tube, the screen of which consists of an alkali halide which reproduces electron tracks in the form of coloured regions. With this tube the electron beam is modulated by the signal coming from amplifier 111, while a slowly-altering voltage is applied to the signal plate, which may be taken for example from a potentiometer driven by clockwork. When using this circuit there is obtained on the screen of the Skiatron a complete picture of the processes in the vacuum space during the variation of the potentiometer voltage. If, for eample, it is a matter of supervising the processing of a complicated television tube, then such an equipment offers the possibility of supervising the individual processes during the formation of the cathodes and the composition of the residual gases during the whole of the forming processes and finally of analysing them. The vacuum engineer thus holds in his hand apparatus which allows him quickly to recognize the appearance of deleterious gases and largely to avoid this occurrence. Instead of the Skiatron tube a normal oscillograph tube may also be employed in which case the line spectrum is photographed with a photographic camera with a continuously moving film.

A further application for a mass-spectrograph process according to the invention consists in the analysis of the surface of solid bodies. It is known that materials adsorbed on the surfaces of solid bodies can be abolished by electron bombardment, these materials being decomposed or evaporated. Even metals of high melting point are not excluded from such evaporation, since with a well-focused electron beam even tungsten can be transformed into the form of vapour.

In FIGURE 5 is shown an electrode arrangement with an improved geometry as compared with the former construction, which can find application for the purpose of surface analysis of solid bodies. This tube includes a cathode 101, an accelerating electrode 102 and a diaphragm 103, through which an electron beam is formed, which as a result of the fields emanating from the remaining electrodes of the mass-spectrograph is laterally deflected and thus strikes the surface of the body 118 to be analysed. Again, it is possible by the application of the principles of the invention, i.e. of periodic ionization with a modulated electron current, to obtain distinct signals for the masses of the ions which appear. The electrode 106 serves also as the signal electrode and is connected with an amplifier 120, a rectifier 121 and a measuring instrument 122. If the potential of the cathode 101 is now modulated by a high-frequency alternating voltage, there result from evaporation of the surface atoms of the body 118 ions and gas molecules which are ionized by the cathode ray. If the signals obtained are recorded by an appropriate recorder, which is connected at 122 instead of the measuring instrument, then in a manner similar to that of the previously-described apparatus a statement may be obtained of the composition of the surface layer and the sequence of evaporation, and from the mass-numbers determined, and the temporal sequence of the development of the lines, there may be drawn conclusions as to the nature of the gases produced. In the investigation of carbohydrates, for example, it is possible to identify in the mass-spectrogram a series of products of decomposition, ranging from hydrogen to the multi-molecular final product.

In the further example of an embodiment according to FIGURE 6 is shown a tube in which the electrodes are of such form that under certain working conditions not only ions but also electrons can be focused. The electron beam formed by the electrodes is employed in surface layer analysis to generate so great an energy that even metals of high melting point are evaporated at the point of impact. For this purpose there is arranged a cathode (not shown), a Wehnelt cylinder 123, as well as focusing electrodes 124 and 125, coaxial with the ion focusing electrodes 103 to 109. The two end electrodes 103 and 109 possess a central aperture through which the electron beam penetrates and can impinge upon the material to be evaporated at 126. The form of the electrodes 103 to 109 is so chosen that no sputtering effects occur, even at high field strengths. A magnetic coil 127 may be provided for additional focusing and alignment of the electron beam. In this figure the electrode 103 serves as the signal output electrode and is connected by way of the amplifier 111 with the oscillograph 112. To modulate the electrons a sinusoidal or pulse voltage is applied to the Wehnelt cylinder 123, the frequency of which is variable at will. In this tube, however, the use of periodic modulation in accordance with the invention results in the difficulty that the signal output electrode 103 is directly influenced by the beam electrons and the modulating signal is thus superimposed upon the output signal. But according to the invention, this difficulty may be overcome by applying the control signal to the tube for brief periods only, and simultaneously blocking the amplifier by keying impulses.

In the drawing only the order of magnitude of the voltages applied to the individual electrodes is shown. In cases where a particularly high beam energy is desired, a multiple of the stated voltages would be employed.

It will be understood that for determining the masses of carriers of negative charges, all the voltages between the end electrodes and the other electrodes bounding the space available for movement of the charge-carriers to be analysed must be reversed in sign.

In FIGURE 7 there is reproduced in perspective representation an electron tube, namely a spectrograph tube that has proved useful in practice. It consists of a glass envelope 201 with a normal base 202, into which are sealed the lead-in and supporting wires for the electrode system. A pumping stem 203 allows the tube to be connected to a vacuum system, in which circulates the gas to be investigated. As in the preceding embodiments the tube contains an ionizing system consisting of the thermionic cathode 204, the control electrode 205 and the end electrode 206. The space for the oscillation of the ion current formed is comprised between the already mentioned end electrode 206, as well as further electrodes 207 to 212, while as a distinction from the preceding embodiments the middle electrode 209, which contains the plane of symmetry of the oscillation, is formed as an extended tube instead of as a short cylinder. The length of the oscillation space between the end electrodes 206 and 212 amounts to 52 mm. All other dimensions are true to scale. A tube of the dimensions shown already has a resolution of 20:1 to 30:1 mass units. An increased resolution can still be obtained by increasing the size of the tube.

What is claimed as new and desired to be secured by Letters Patent is:

1. System of separating and indicating ions of different relative masses comprising, in an envelope connected with a vacuum system, two cup-shaped end electrodes on a common axis, a number of ringlike lens electrodes coaxially thereto and arranged symmetrically relative to a transverse median plane between the end electrodes and connected to D.C. voltage sources, the arrangement of the electrodes and their voltages being chosen such that ions generated in a source of confined region within an end electrode where atoms or molecules are ionized, oscillate with respect to the median plane with a definite frequency, means to modulate the potential of at least one of the electrodes with a high frequency voltage equal to the oscillation frequency of the ions and means indicating the relative number of ions oscillating in resonance with the high frequency.

2. System of separating and indicating ions of different relative masses comprising, in an envelope connected with a vacuum system, two cup-shaped end electrodes on a common axis, a number of ringlike lens electrodes coaxially thereto and arranged symmetrically relative to a transverse median plane between the end electrodes and connected to D.C. voltage sources, the arrangement of the electrodes and their voltages being chosen such that ions generated in a source of confined region within an end electrode where atoms or molecules are ionized, oscillate with respect to the median plane with a definite frequency, means to modulate the number of the ions generated in said source with a high frequency voltage equal to the oscillation frequency of the ions or a multiple thereof and means indicating the relative number of ions oscillating in resonance with the high frequency.

3. System of separating and indicating ions of different relative masses comprising, in an envelope connected with the vacuum system, two cup-shaped end electrodes on a common axis, a number of ringlike lens electrodes coaxially thereto and arranged symmetrically relative to a transverse median plane between the end electrodes and connected to D.C. voltage sources, the arrangement of the electrodes and of their voltages being chosen such that ions emanating from an ion source within one end electrode are focused along the axis of the electrodes to the corresponding point within the other end electrode and are oscillating back and forth between the end electrodes, means to modulate the potential of at least one of the electrodes with a high frequency equal to the oscillation frequency of the ions or a multiple thereof, and means indicating the relative number of the ions oscillating in resonance with the high frequency.

4. System of separating and indicating ions of different relative masses comprising, in an envelope connected with the vacuum system, two cup-shaped end electrodes on a common axis, a number of ringlike lens electrodes coaxially thereto and arranged symmetrically relative to a transverse median plane between the end electrodes and connected to D.C. voltage sources, the arrangement of the electrodes and of their voltages being chosen such that ions emanating from an ion source within one end electrode are focused along the axis of the electrodes to the corresponding point within the other end electrode and are oscillating back and forth between the end electrodes, means to modulate the number of ions generated in said source with a high frequency equal to the oscillation frequency of the ions or a multiple thereof, and means indicating the relative number of the ions oscillating in resonance with the high frequency.

5. System of separating and indicating ions of different relative masses comprising, in an envelope connected with the vacuum system, two cup-shaped end electrodes on a common axis, a number of ringlike lens electrodes coaxially thereto and arranged symmetrically relative to a transverse median plane between the end electrodes and connected to D.C. voltage sources, the arrangement of the electrodes and of their voltages being chosen such that ions emanating from an ion source within one end electrode are focused along the axis of the electrodes to the corresponding point within the other end electrode and are oscillating back and forth between the end electrodes, means to modulate the potential of at least one of the electrodes with a high frequency equal to the oscillation frequency of the ions or a multiple thereof, and means indicating the relative number of the ions oscillating in resonance with the high frequency, these means comprising an amplifier connected with one end electrode and adapted to amplify the current of ions surmounting a potential barrier within the end electrode and captured by this electrode, means to vary said high frequency, and an indicator showing the relation between the current flowing to the end electrode and the high frequency.

6. System of separating and indicating ions of different relative masses comprising, in an envelope connected with the vacuum system, two cup-shaped end electrodes on a common axis, a number of ringlike lens electrodes coaxially thereto and arranged symmetrically relative to a transverse median plane between the end electrodes and connected to D.C. voltage sources, the arrangement of the electrodes and of their voltages being chosen such that ions emanating from an ion source within one end electrode are focused along the axis of the electrodes to the corresponding point within the other end electrode and are oscillating back and forth between the end electrodes, means to modulate the number of ions generated in said source with a high frequency equal to the oscillation frequency of the ions or a multiple thereof, and means indicating the relative number of the ions oscillating in resonance with the high frequency, these means comprising an amplifier connected with one end electrode adapted to amplify the current induced in the outer circuit of this end electrode by the ions oscillating in resonance with the high frequency, means to vary the high frequency, and an indicator showing the relation between induced current and frequency.

7. System of separating and indicating ions of different relative masses comprising, in an envelope connected with the vacuum system, two cup-shaped end electrodes on a common axis, a number of ringlike lens electrodes coaxially thereto and arranged symmetrically relative to a transverse median plane between the end electrodes and connected to D.C. voltage sources, the arrangement of the electrodes and of their voltages being chosen such that ions emanating from an ion source within one end electrode are focused along the axis of the electrodes to the corresponding point within the other end electrode and are oscillating back and forth between the end electrodes, means to modulate the number of ions generated in said source with a high frequency equal to $n$ times the oscillation frequency of the ions wherein $n$ is any integer number including 1, and means indicating the relative number of the ions oscillating in resonance with the high frequency, these means comprising an amplifier connected with one end electrode adapted to amplify the current induced in the outer circuit of this end electrode by the ions oscillating in resonance with the high frequency, means to vary the high frequency according to an oscillation of low frequency, and a cathode ray oscillograph, its time deflection being synchronised by the low frequency oscillation and its signal deflection being proportional to the current flowing in the outer circuit of one of the end electrodes.

8. Mass spectrometer tube, comprising an envelope with a pump stem for connection with a vacuum system, electrodes comprising two cup-shaped end electrodes and one tubular electrode mounted coaxially with the end electrodes, a source of electrons comprising a thermionic cathode, a control grid forming a cathode ray system directing a beam of electrons into the interior of one cup-shaped electrode, and further electrodes of annular shape surrounding the axis and arranged adjacent to the cup-shaped electrodes and being on such potential that an electron optical lens system is established thereby which confines the beam of ions oscillating along the tube near the axis.

9. Mass spectrometer tube comprising an envelope having a disc seal with several pinlike connections to its electrodes, a pump stem, a cylindrical electrode, two ringlike electrodes arranged on either end of the cylindrical electrode and coaxially with the axis of the cylinder, two cup-shaped electrodes coaxially with said cylindrical electrode and directed with their open sides towards the ringlike electrodes, one of the cup-shaped electrodes having at its bottom an aperture covered by a grid, a thermionic cathode lying in the axis of the system on the outside of the apertured cup electrode, and a control electrode between the thermionic cathode and the apertured cup electrode.

10. Mass spectrometer tube comprising an envelope having a disc seal with pinlike connections to all electrodes except one, a pump stem, a cylindrical electrode, two ringlike electrodes arranged on either end of the cylindrical electrode and coaxially with the axis of the cylinder, two cup-shaped electrodes coaxially with said cylindrical electrode and directed with their open sides towards the ringlike electrodes, one of the cup-shaped electrodes having at its bottom an aperture covered by a grid, a thermionic emitter lying in the axis of the system on the outside of the apertured cup electrode, and a control electrode between the thermionic emitter and the apertured cup electrode, the other cup-shaped electrode being sealed separately.

11. System comprising a tube with an envelope having a pump stem, a cylindrical electrode, two ringlike electrodes mounted at the ends, respectively, of said cylindrical electrode and coaxially with the axis of the tube, two cup-shaped electrodes coaxially with said cylindrical electrode and directed with their open sides towards the ringlike electrodes, one of the cup-shaped electrodes having at its bottom an aperture covered by a grid, a thermionic emitter arranged in the axis of the system on the outside of the apertured one of said cup-shaped electrodes, and a control electrode between the thermionic emitter and said apertured cup-shaped electrode, and means generating a magnetic focussing field, the lines of forces being substantially parallel to the axis of the tube.

References Cited in the file of this patent
UNITED STATES PATENTS

| | | |
|---|---|---|
| 2,761,974 | Burk et al. | Sept. 4, 1956 |
| 2,775,708 | Parsons et al. | Dec. 25, 1956 |
| 2,782,316 | Robinson | Feb. 19, 1957 |
| 2,854,583 | Robinson | Sept. 30, 1958 |